United States Patent
Tourunen et al.

(10) Patent No.: US 6,930,980 B2
(45) Date of Patent: Aug. 16, 2005

(54) DATA PACKET NUMBERING IN PACKET-SWITCHED DATA TRANSMISSION

(75) Inventors: Ari Tourunen, Espoo (FI); Juha Kalliokulju, Vesilahti (FI); Jan Suumäki, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 688 days.

(21) Appl. No.: 09/827,185

(22) Filed: Apr. 5, 2001

(65) Prior Publication Data

US 2001/0043579 A1 Nov. 22, 2001

(30) Foreign Application Priority Data

Apr. 7, 2000 (FI) ............................................. 20000836

(51) Int. Cl.[7] .......................... H04L 12/26; H04Q 7/00
(52) U.S. Cl. ...................................... 370/236; 370/331
(58) Field of Search ................................ 370/235, 236, 370/328, 331, 332, 333, 345, 349, 469; 455/436, 437, 438, 439, 442

(56) References Cited

U.S. PATENT DOCUMENTS

| | | | | |
|---|---|---|---|---|
| 6,134,439 A | * | 10/2000 | Sipila et al. | 455/436 |
| 6,301,479 B1 | * | 10/2001 | Roobol et al. | 455/436 |
| 6,546,425 B1 | * | 4/2003 | Hanson et al. | 709/227 |

FOREIGN PATENT DOCUMENTS

| | | |
|---|---|---|
| EP | 1083768 A1 | 3/2001 |
| WO | WO 99/08457 | 2/1999 |
| WO | WO 99/22557 | 5/1999 |
| WO | WO 99/63703 | 12/1999 |
| WO | WO 00/64211 | 10/2000 |
| WO | WO 00/74341 | 12/2000 |

OTHER PUBLICATIONS

"Packet Data Over Cellular Networks: The CDPD Approach", Apostolis K. Salkintzis, IEEE Communications Magazine, 1999, pp. 152–159.

* cited by examiner

Primary Examiner—Kwang Bin Yao
(74) Attorney, Agent, or Firm—Perman & Green, LLP.

(57) ABSTRACT

A method and a telecommunication system for data packet numbering in packet-switched data transmission in connection with a handover, in which the responsibility for a connection is transferred from the connection between a mobile station and a first wireless telecommunication network to the connection between said mobile station and a second wireless telecommunication network. In the first wireless telecommunication network a data packet number space available for data packet numbering is bigger than a data packet number space of the second wireless telecommunication network. Data packet numbering is restricted in the first wireless telecommunication network such that the numbers of the data packets of the first wireless telecommunication network do not exceed the maximum value of the data packet number space of the second wireless telecommunication network.

45 Claims, 4 Drawing Sheets

DATA PACKET NUMBERING IN PACKET-SWITCHED DATA TRANSMISSION

BACKGROUND OF THE INVENTION

The invention relates to packet-switched data transmission and more precisely to optimization of data packet numbering, particularly in connection with a reliable (acknowledged) transmission.

In the development of the so-called third generation mobile communication systems, for which at least the terms UMTS (Universal Mobile Telecommunication System) and IMT-2000 (International Mobile Telephone System) are used, one starting point has been that they would be so compatible as possible with the second generation mobile communication systems, such as the GSM (Global System for Mobile Communications). The UMTS core network, for instance, is planned to be implemented on the basis of the GSM core network, and thus the already existing networks can be utilized as efficiently as possible. Further, one aim is to enable the third generation mobile stations to utilize a handover between the UMTS and the GSM. This applies to packet-switched data transmission as well, particularly between the UMTS and the GPRS (General Packet Radio Service), which is planned to be used in the GSM.

In packet-switched data transmission, a reliable, i.e. acknowledged, transmission or an unreliable, i.e. unacknowledged, transmission can be used. In the reliable data transmission, the recipient transmits an acknowledgement of the received data packets PDU (Protocol Data Unit) to the transmitter, and the transmitter can transmit the lost or the faulty data packets anew. In the GPRS system, the sub-protocol LLC (Logical Link Control) of the GPRS is responsible for the reliability and acknowledgement of data packet transmission. In an inter-SGSN (Serving GPRS Support Node) handover in the GPRS system, data transmission reliability is ensured by means of a convergence protocol SNDCP (Sub-Network Dependent Convergence Protocol) above the LLC protocol. An 8-bit N-PDU number (Network PDU) is associated with data packets, and on the basis of this number the data packets transmitted to the recipient can be checked.

In the UMTS according to the current specifications, reliability in packet-switched data transmission is ensured by an RLC sequence number of the RLC layer (Radio Link Control) of the packet data protocol. In this respect, the RLC layer of the UMTS corresponds to the LLC layer of the GPRS. In the UMTS, reliability in a handover between the serving nodes is ensured by means of the convergence protocol PDCP (Packet Data Convergence Protocol) above the RLC layer. On the PDCP layer of the UMTS, a 16-bit data packet number is associated with the data packet of the convergence protocol layer PDCP, and this PDCP-PDU number forms a data packet number corresponding logically to the N-PDU number of the GPRS, and on the basis of this number it is checked in the handover that all data packets have been transferred reliably.

In the handover from the GPRS to the UMTS, 8-bit N-PDU numbers are converted in the serving node 3G-SGSN supporting the UMTS to 16-bit PDCP-PDU numbers, which are used for acknowledging the received data packets. Correspondingly, in the handover from the UMTS to the GPRS, 16-bit PDCP-PDU numbers are converted in the serving node 3G-SGSN to 8-bit N-PDU numbers, which are transmitted to the serving node 2G-SGSN of the GPRS and which are used correspondingly for acknowledging the data packets. 8-bit N-PDU numbers are converted to 16-bit PDCP-PDU numbers by extending the value of the N-PDU number by eight most significant bits, each one having the value zero. The conversion of 16-bit PDCP-PDU numbers to 8-bit N-PDU numbers is correspondingly performed by ignoring eight most significant bits from the value of the PDCP-PDU number. As the handover has been started, the data packets PDU are placed to a buffer to wait until the responsibility for the connection has been transferred to the serving node SGSN of another system, and the transmitted data packets can be deleted from the buffer whenever an acknowledgement of the received data packets is obtained from the recipient.

A problem in the above arrangement is the creation of N-PDU numbers from PDCP-PDU numbers. Due to a delay in the system, the buffer may contain a large number of data packets PDCP-PDU. The data packet number space that can be used for numbering data packets PDCP-PDU in the UMTS is bigger (16 bits) than the data packet number space (8 bits) used for N-PDU numbering in the GPRS system. If the number of the buffered data packets PDCP-PDU exceeds the number that can be expressed with eight bits, two or more data packets may have the same N-PDU number, as eight most significant bits are ignored in the 16 bits of the PDCP-PDU numbers. Thus, the recipient can no longer unambiguously define the original PDCP-PDU number on the basis of the N-PDU number of the received data packet, nor the data packet to be acknowledged, and the reliability of the handover cannot be ensured any more.

BRIEF DESCRIPTION OF THE INVENTION

The object of the invention is thus to provide an improved method and an apparatus implementing the method to avoid the above problems. The objects of the invention are achieved by a method and a system, which are characterized in what is said in the independent claims. The preferred embodiments of the invention are disclosed in the dependent claims.

The invention is based on the idea that the utilization of a 16-bit number space is restricted in PDCP-PDU numbering, at least in the handover from the UMTS to the GPRS, such that the conversion of PDCP-PDU numbers according to the UMTS to N-PDU numbers according to the GPRS system is performed unambiguously. According to a preferred embodiment of the invention, the maximum number of unacknowledged data packets PDCP-PDU that are to be transferred for the RLC layer to be transmitted is restricted in such a manner that the PDCP-PDU number of each unacknowledged data packet can be converted unambiguously to an 8-bit N-PDU number.

The method and system of the invention provide the advantage that a reliable data transmission can be ensured in the handover from the UMTS to the GPRS system. A further advantage is that the data packets to be acknowledged and deleted from the buffer can be defined unambiguously. Still another advantage is that according to embodiments of the invention, 16-bit PDCP-PDU numbers can be utilized most of the time in a normal UMTS data transmission, and 8-bit PDCP-PDU numbers are only provided for use in the handover.

BRIEF DESCRIPTION OF THE DRAWINGS

In the following the invention will be described in greater detail in connection with the preferred embodiments, with reference to the attached drawings, in which.

DETAILED DESCRIPTION OF THE INVENTION

The invention will now be described by way of example in connection with packet radio services according to the UMTS and the GPRS system. However, the invention is not restricted only to these systems, but it can be applied to any packet-switched data transmission method requiring an adaptation of data packet numbering in an inter-system handover. The invention can particularly be applied to a reliable handover between the UMTS and the GPRS. Thus, the term "PDCP" used in this description can be replaced, where possible, with the corresponding GPRS function SNDCP. Further, the term "dual-system mobile station" used in this application refers typically to a mobile station capable of functioning both in the UMTS network and the GSM/GPRS network, but the invention can also be applied to mobile stations of other telecommunication systems having the same problems in their inter-system data transmission.

Figure 1:
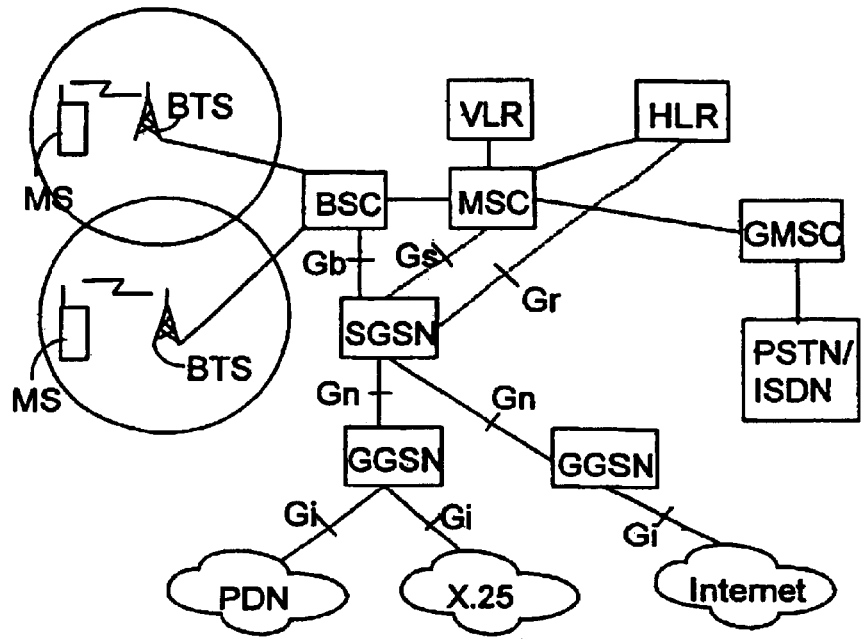
FIG. 1 shows a block diagram of the structure of the GSM/GPRS system.

FIG. 1 illustrates how the GPRS system is built on the basis of the GSM system. The GSM system comprises mobile stations MS, which communicate with base transceiver stations BTS over the radio path. A base station controller BSC is connected with several base transceiver stations BTS, which use radio frequencies and channels controlled by the base station controller BSC. The base station controllers BSC communicate via an interface A with a mobile services switching centre MSC, which is responsible for connection establishments and for routing calls to right addresses. Two databases comprising information on mobile subscribers are used as help: a home location register HLR with information on all subscribers of the mobile communication network and the services they have subscribed to, and a visitor location register VLR with information on the mobile stations visiting the area of a certain mobile services switching centre MSC. The mobile services switching centre MSC is in connection with other mobile services switching centres via a gateway mobile services switching centre GMSC and with a fixed telephone network PSTN (Public Switched Telephone Network). A more detailed description of the GSM system can be found in the ETSI/GSM specifications and the work *The GSM system for Mobile Communications*, M. Mouly and M. Pautet, Palaiseau, France, 1992, ISBN:2-957190-07-7.

The GPRS system connected to the GSM network comprises two, almost independent functions: a gateway GPRS support node GGSN and a serving GPRS support node SGSN. The GPRS network may comprise several gateway nodes and serving nodes, and typically several serving nodes SGSN are connected to one gateway node GGSN. Both nodes SGSN and GGSN function as routers which support the mobility of the mobile station, control the mobile communication system and route data packets to mobile stations regardless of their location and the protocol used. The serving node SGSN communicates with the mobile station MS via the mobile communication network. The connection to the mobile communication network (interface Gb) is typically established either via the base transceiver station BTS or the base station controller BSC. The function of the serving node SGSN is to detect the mobile stations in its service area which are capable of GPRS connections, send data packets to and receive data packets from these mobile stations and monitor the location of the mobile stations in its service area. In addition, the serving node SGSN communicates with the mobile services switching centre MSC and the visitor location register VLR via a signalling interface Gs and with the home location register HLR via an interface Gr. There are also GPRS records which contain the contents of subscriber-specific packet data protocols stored in the home location register HLR.

The gateway node GGSN functions as a gateway between the GPRS network and an external data network PDN (Packet Data Network). The external data network may be e.g. the GPRS network of another network operator, the Internet, an X.25 network or a private local area network. The gateway node GGSN communicates with these data networks via an interface Gi. The data packets to be transferred between the gateway node GGSN and the serving node SGSN are always encapsulated according to the GPRS standard. The gateway node SGSN also contains the PDP addresses (Packet Data Protocol) and routing data, i.e. the SGSN addresses, of the GPRS mobile stations. The routing data are used for linking data packets between the external network and the serving node SGSN. The GPRS core network between the gateway node GGSN and the serving node SGSN is a network utilizing an IP protocol, preferably IPv6 (Internet Protocol, version 6).

In packet-switched data transmission, the term "context" is generally used for the connection between a terminal and a network address, which connection is provided by a telecommunication network. The term refers to a logical link between target addresses, through which link data packets are transmitted between the target addresses. This logical link can exist, even though no packets were transmitted, and thus it does not deprive the other connections of the capacity of the system either. In this respect, the context differs from a circuit-switched connection, for example.

Figure 2:
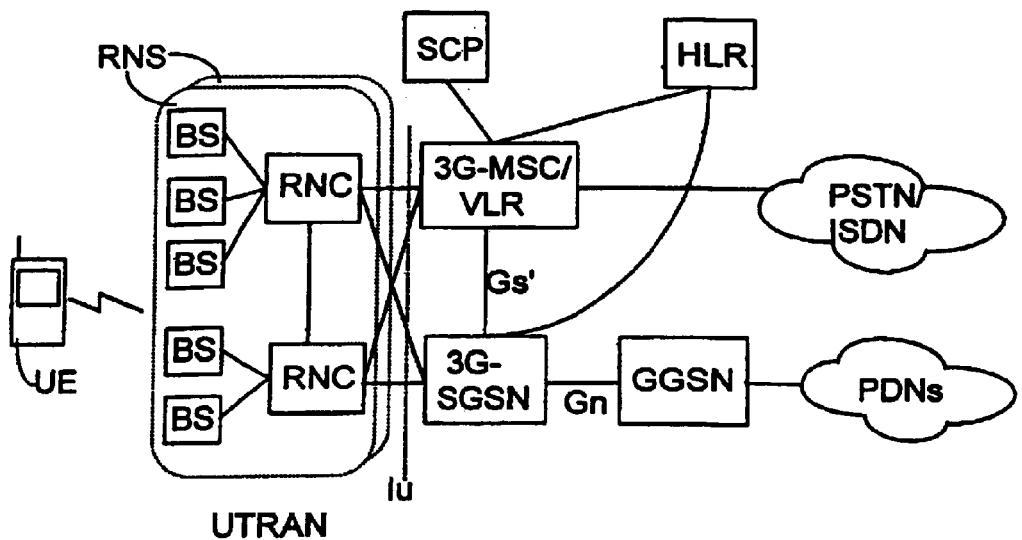
FIG. 2 shows a block diagram of the structure of the UMTS.

FIG. 2 is a simplification of how a third generation UMTS network can be built in connection with a further developed GSM core network. In the core network, the mobile services switching centre/visitor location register 3G-MSC/VLR communicates with the home location register HLR and preferably also with a service control point SCP of the intelligent network. A connection to the serving node 3G-SGSN is established via an interface Gs' and to the fixed telephone network PSTN/ISDN as described above in connection with the GSM. A connection from the serving node 3G-SGSN to the external data networks PDN is established in the entirely corresponding way as in the GPRS system, i.e. via an interface Gn to the gateway node GGSN, from which there is a further connection to the external data networks PDN. The connections of the mobile services switching centre 3G-MSC/VLR and the serving node 3G-SGSN to the radio network UTRAN (UMTS Terrestrial Radio Access Network) are established via the interface Iu, which, compared with the GSM/GPRS system, combines the functionalities of the interfaces A and Gb, in addition to which entirely new functionalities can be created for the interface Iu. The radio network UTRAN comprises several radio network subsystems RNS, which further comprise radio network controllers RNC and, in connection with them, base stations BS, for which also the term "Node B" is used. The base stations are in radio connection with user equipment UE, typically mobile stations MS.

Figure 3A:
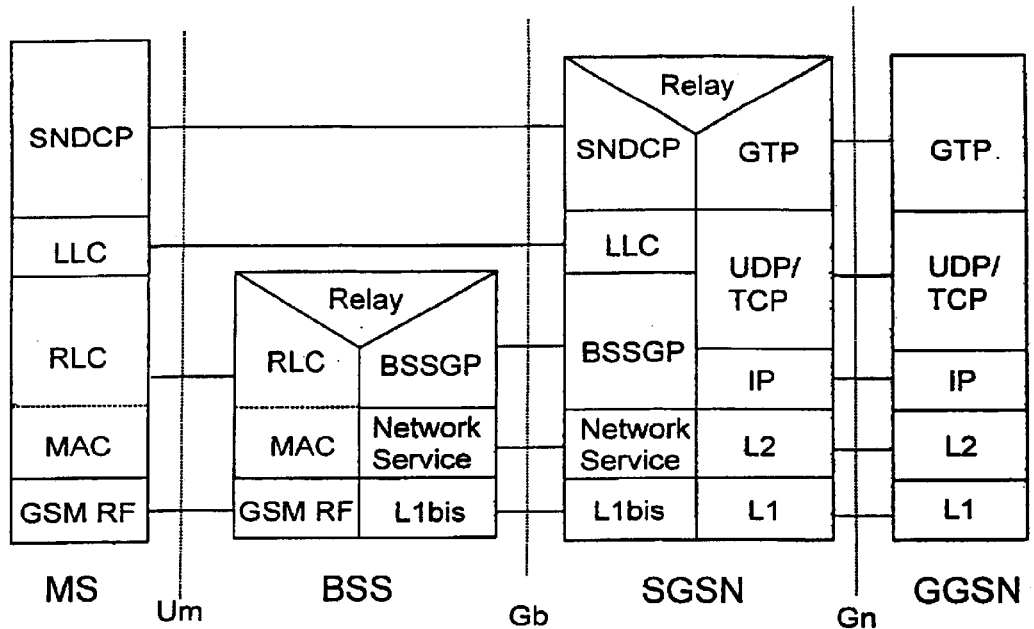
FIGS. 3a and 3b show protocol stacks of GPRS and UMTS user data connections.
Figure 3B:
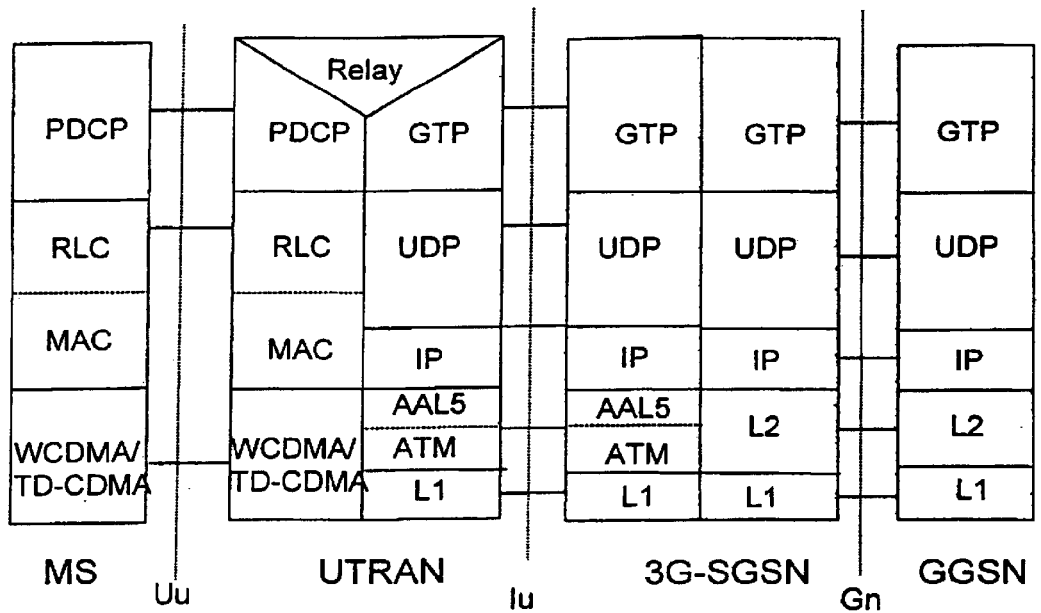

FIGS. 3a and 3b show protocol stacks of the GPRS and the UMTS respectively, and the specifications according to these stacks are used for user data transmission in these systems. FIG. 3a illustrates a protocol stack between the mobile station MS and the gateway node GGSN in the GPRS system, the protocol stack being used for user data transmission. The data transmission between the mobile station MS and the base station system of the GSM network over the radio interface Um is performed in accordance with the conventional GSM protocol. On the interface Gb between the base station system BSS and the serving node SGSN, the lowest protocol layer has been left open, and either the ATM protocol or the Frame Relay protocol is used in the second layer. The BSSGP layer (Base Station System GPRS Protocol) above it provides the data packets to be transmitted with specifications relating to routing and quality of service and with signallings relating to data packet acknowledgement and Gb interface management.

Direct communication between the mobile station MS and the serving node SGSN is defined in two protocol layers, SNDCP (Sub-Network Dependent Convergence Protocol) and LLC (Logical Link Control). User data transmitted in the SNDCP layer are segmented to one or more SNDC data units, whereby the user data and the TCP/IP header field or the UDP/IP header field associated with it can optionally be compressed. The SNDC data units are transmitted in LLC frames, which are associated with address and checking information essential to the data transmission, and in which frames the SNDC data units can be encrypted. The function of the LLC layer is to maintain the data transmission connection between the mobile station MS and the serving node SGSN and to retransmit the damaged frames. The serving node SGSN is responsible for routing data packets coming from the mobile station MS further to the right gateway node GGSN. A tunnelling protocol (GTP, GPRS Tunnelling Protocol) is used in this connection, encapsulating and tunnelling all user data and signalling that are transmitted through the GPRS core network. The GTP protocol is run above the IP used by the GPRS core network.

A protocol stack of FIG. 3b used in the UMTS packet-switched user data transmission is very much equal to the protocol stack of the GPRS, yet with some substantial differences. As it can be seen from FIG. 3b, in the UMTS the serving node 3G-SGSN does no longer establish a direct connection on any protocol layer to the user equipment UE, such as the mobile station MS, but all data are transmitted through the radio network UTRAN. The serving node 3G-SGSN functions chiefly as a router, which transmits the data packets according to the GTP protocol to the radio network UTRAN. On the interface Uu between the radio network UTRAN and the user equipment UE, lower level data transmission on the physical layer is performed according to the WCDMA protocol or the TD-CDMA protocol. The functions of the RLC and MAC layers above the physical layer are very much similar to those of the corresponding layers of the GSM, yet in such a manner that functionalities of the LLC layer are delegated to the RLC layer of the UMTS. In respect to the GPRS system, the PDCP layer above them mainly replaces the SNDCP layer and the functionalities of the PDCP layer are very much similar to the functionalities of the SNDCP layer.

Figure 4:
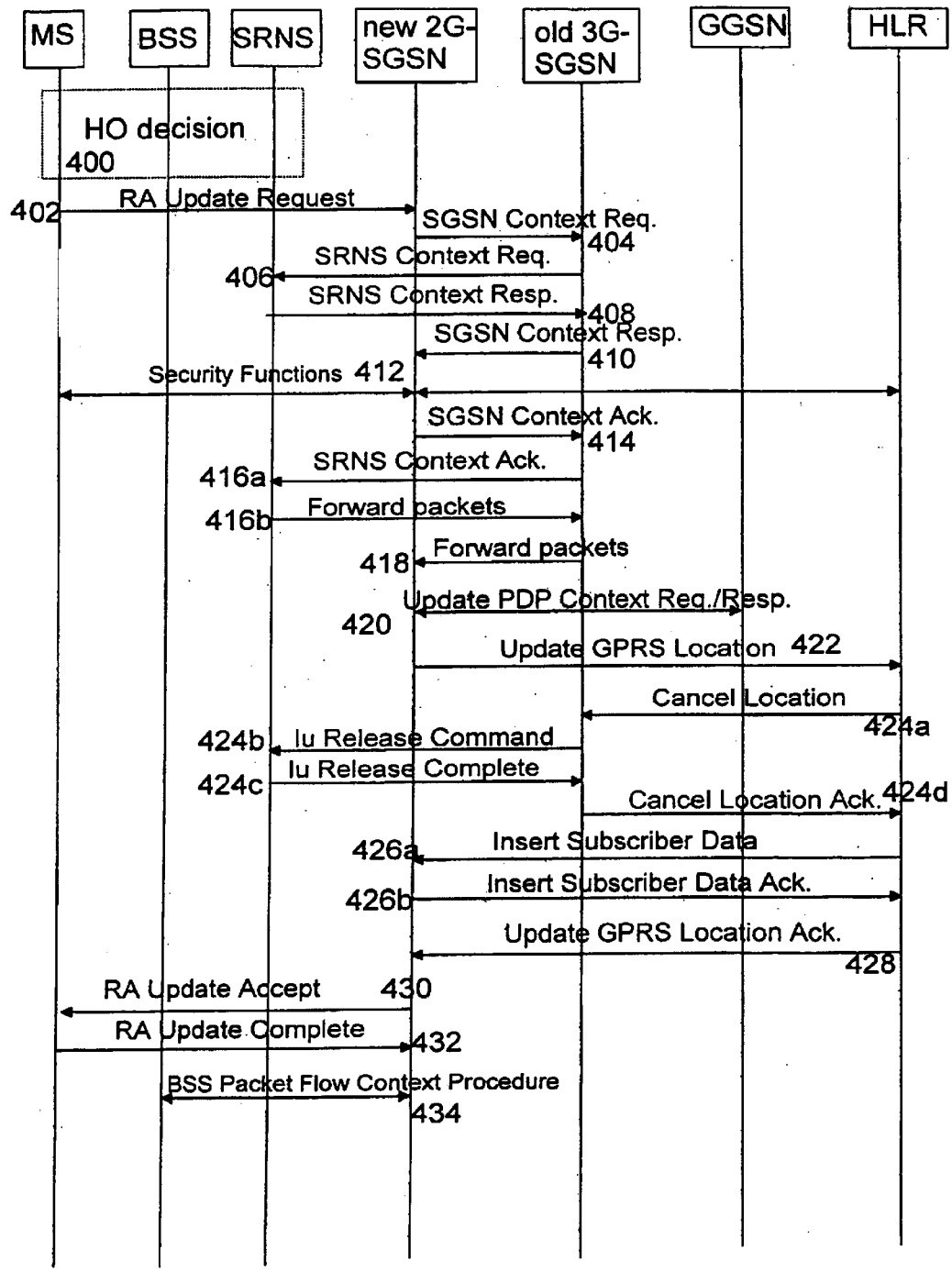
FIG. 4 shows a signalling diagram of a prior art handover process from the UMTS to the GPRS system.

The signalling diagram of FIG. 4 illustrates a prior art handover from the UMTS to the GPRS. Such a handover takes place when the mobile station MS moves during a packet data transmission from the UMTS cell to the GSM/GPRS cell, which uses a different serving node SGSN. The mobile station MS and/or the radio networks BSS/UTRAN decide to perform a handover (step 400). The mobile station transmits the new serving node 2G-SGSN a request for updating the routing area (RA Update Request, 402). The serving node 2G-SGSN transmits the old serving node 3G-SGSN a serving node context request defining the mobility management and the PDP context of the mobile station (SGSN Context Request, 404). The serving node 3G-SGSN transmits the radio network subsystem SRNS (Serving RNS), more precisely its radio network controllers SRNC (Serving RNC), responsible for the packet data connection, an SRNS context request (406), in response to which the SRNS stops transmitting data packets to the mobile station MS, places the data packets to be transmitted to the buffer and transmits a response (SRNS Context Response, 408) to the serving node 3G-SGSN. In this connection, the radio network subsystem SRNS for example converts the 16-bit PDCP-PDU numbers of the data packets to be placed to the buffer to 8-bit N-PDU numbers by ignoring eight most significant bits. Having received the information on the mobility management and the PDP context of the mobile station MS, the serving node 3G-SGSN reports it to the serving node 2G-SGSN (SGSN Context Response, 410).

If necessary, the serving node 2G-SGSN may authenticate the mobile station from the home location register HLR (Security Functions, 412). The new serving node 2G-SGSN informs the old serving node 3G-SGSN of being ready to receive data packets of the activated PDP contexts (SGSN Context Ack, 414), in response to which the serving node 3G-SGSN requests the radio network subsystem SRNS (SRNS Context Ack, 416*a*) to transmit the data packets in the buffer to the serving node 3G-SGSN (Forward Packets, 416*b*), which forwards them to the serving node 2G-SGSN (Forward Packets, 418). The serving node 2G-SGSN and the gateway node GGSN update the PDP context according to the GPRS system (Update PDP Context Request/Response, 420). Thereafter, the serving node 2G-SGSN informs the home location register HLR of the new operating node (Update GPRS Location, 422), and the connection between the old serving node 3G-SGSN and the radio network subsystem SRNS is disconnected (424*a*, 424*b*, 424*c*, 424*d*), the required subscriber data are transmitted to the new serving node 2G-SGSN (426*a*, 426*b*) and the home location register HLR acknowledges the new serving node 2G-SGSN (Update GPRS Location Ack, 428).

After this, the serving node 2G-SGSN checks the subscriber rights of the mobile station MS and the location of the mobile station MS in its area and creates a logical link between the serving node 2G-SGSN and the mobile station MS, after which the request for updating the routing area required by the mobile station MS can be accepted (RA Update Accept, 430). In this connection, the information on the successful reception of the data packets is transmitted to the mobile station MS, the data packets having been transmitted by the mobile station MS to the radio network subsystem SRNS of the UMTS system before the handover process was started. Said data packets are identified on the basis of the N-PDU numbers converted in the above manner. The mobile station MS acknowledges the acceptance of the request for updating the routing area (RA Update Complete, 432), whereby the information is transmitted to the serving node 2G-SGSN that the mobile station MS has successfully received the data packets, which the serving node 3G-SGSN has transmitted through the radio network subsystem SRNS before the handover process was started. The mobile station MS identifies the data packets with the 8-bit N-PDU numbers. Thereafter, the new serving node 2G-SGSN may start transmitting data packets through the base station system (434).

The formation of 8-bit N-PDU numbers from 16-bit PDCP-PDU numbers and the resulting problems are illustrated in the following table.

The above problems concerning data packet identification in a handover can be avoided by a procedure of the invention, by which the utilization of a 16-bit number space is restricted in PDCP-PDU numbering at least in the handover from the UMTS to the GPRS such that PDCP-PDU numbers according to the UMTS are converted to N-PDU numbers according to the GPRS system unambiguously.

According to an embodiment, the maximum number of unacknowledged data packets PDCP-PDU that are to be

| Bit number | 16 | 15 | 14 | 13 | 12 | 11 | 10 | 9 | 8 | 7 | 6 | 5 | 4 | 3 | 2 | 1 | 8-bit value |
|---|---|---|---|---|---|---|---|---|---|---|---|---|---|---|---|---|---|
| 100 | 0 | 0 | 0 | 0 | 0 | 0 | 0 | 0 | 0 | 1 | 1 | 0 | 0 | 1 | 0 | 0 | 100 |
| 200 | 0 | 0 | 0 | 0 | 0 | 0 | 0 | 0 | 1 | 1 | 0 | 0 | 1 | 0 | 0 | 0 | 200 |
| 300 | 0 | 0 | 0 | 0 | 0 | 0 | 0 | 1 | 0 | 0 | 1 | 0 | 1 | 1 | 0 | 0 | 44 |
| 400 | 0 | 0 | 0 | 0 | 0 | 0 | 1 | 1 | 0 | 0 | 1 | 0 | 0 | 0 | 0 | 0 | 144 |
| 500 | 0 | 0 | 0 | 0 | 0 | 0 | 1 | 1 | 1 | 1 | 1 | 0 | 1 | 0 | 0 | 0 | 244 |
| 600 | 0 | 0 | 0 | 0 | 0 | 0 | 1 | 0 | 0 | 1 | 0 | 1 | 1 | 0 | 0 | 0 | 88 |
| 700 | 0 | 0 | 0 | 0 | 0 | 1 | 0 | 1 | 0 | 1 | 1 | 1 | 1 | 0 | 0 | 0 | 188 |
| 800 | 0 | 0 | 0 | 0 | 0 | 1 | 1 | 0 | 0 | 1 | 0 | 0 | 0 | 0 | 0 | 0 | 32 |
| 94 | 0 | 0 | 0 | 0 | 0 | 0 | 0 | 0 | 0 | 1 | 0 | 1 | 1 | 1 | 1 | 0 | 94 |
| 350 | 0 | 0 | 0 | 0 | 0 | 0 | 1 | 0 | 1 | 0 | 1 | 1 | 1 | 1 | 1 | 0 | 94 |
| 606 | 0 | 0 | 0 | 0 | 0 | 1 | 0 | 0 | 1 | 0 | 1 | 1 | 1 | 1 | 1 | 0 | 94 |
| 862 | 0 | 0 | 0 | 0 | 0 | 1 | 1 | 0 | 1 | 0 | 1 | 1 | 1 | 1 | 1 | 0 | 94 |

The table shows by way of example how decimal numbers represented as 16 bits are converted to be represented as 8 bits in the above manner. As only 8 least significant bits are taken into account in the conversion, full hundreds 100 to 800 represented as 16 bits obtain in the 8-bit representation different values, which all remain under 255. The problem is further illustrated by numbers 94, 350, 606 and 862, which, when represented as 16 bits, form the same 8-bit binary representation that obtains the value 94. Thus, if the buffer contains almost 900 data units PDCP-PDU, the data units having the above mentioned PDCP-PDU numbers are represented similarly as 8 bits. When the recipient acknowledges the successfully received data packets to the transmitter, the transmitter cannot conclude on the basis of the acknowledged 8-bit numbers unambiguously, which data packet can be deleted from the buffer.

Figure 5:
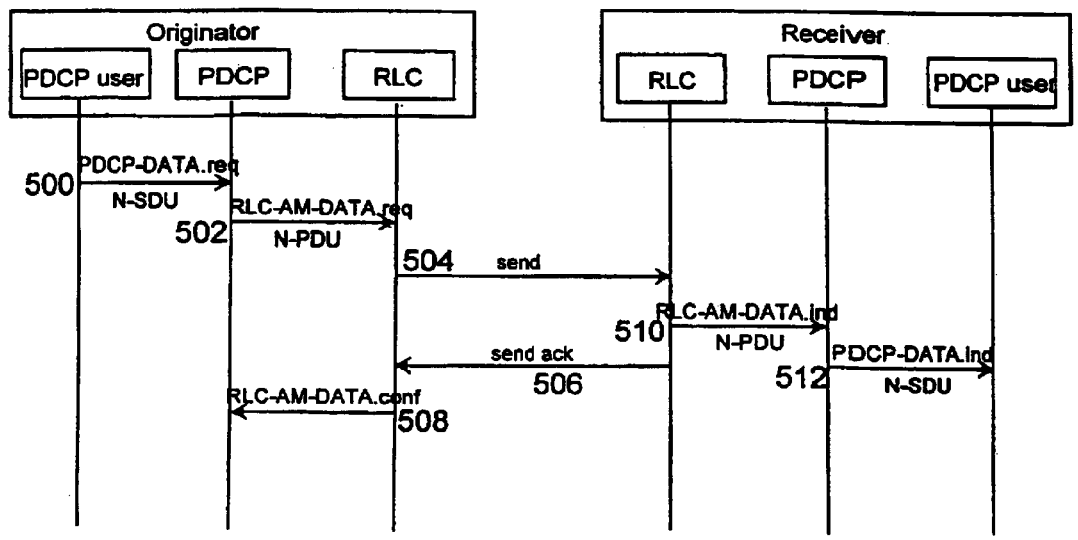
FIG. 5 shows a signalling diagram of reliable data transmission and data packet acknowledgement in PDCP data transmission.

FIG. 5 illustrates how data transmission is acknowledged and how data packets propagate, when the acknowledged transmission is used in the PDCP data transmission. A PDCP entity receives from the user a request (PDCP-DATA.request, 500) for transmitting data packets, and in connection with this request data packets PDCP-SDU (Service Data Unit) are also received, which are also called N-SDU, since they are data packets of the network layer. The PDCP entity compresses the header field of the data packets and transmits the data packets PDCP-PDU formed this way and the identification data of the radio link to the RLC layer (RLC-AM-DATA.request, 502). To put it simply, the RLC layer is responsible for the transmission of the data packets PDCP-PDU (send, 504) and for the acknowledgement of a successful transmission (send ack, 506). In the PDCP entity the data packets N-SDU are placed to the buffer, from which they are not deleted until the acknowledgement is received from the RLC layer (RLC-AM-DATA.conf, 508) that the data packets have been successfully transferred to the recipient. The receiving PDCP receives the transmitted PDCP-PDUs from the RLC layer (RLC-AM-DATA.indication, 510), and the PDCP entity decompresses the data packets PDCP-PDU. This way, the original data packets N-SDU can be returned and they can further be transferred to the user (PDCP-DATA.indication, 512).

transferred to the RLC layer to be transmitted is restricted in such a manner that the PDCP-PDU number of each unacknowledged data packet can be converted unambiguously to an 8-bit N-PDU number. The RLC layer acknowledges each successfully received data packet PDCP-PDU according to FIG. 5, and on the basis of these acknowledgements the PDCP entity deletes the corresponding data packets PDCP-PDU from the buffer. The number of data packets to be transferred from the PDCP entity to the RLC layer and thereby the number of data packets to be placed to the buffer in the PDCP entity is preferably restricted according to the formula The maximum number of data packets=$2^n-1$, where n is the bit number of data packet numbers. When an n-bit sequence number space is utilized, the formula is defined on the basis of general protocol design rules. In this case, the biggest allowable size of a transmitting window is $2^n-1$. If more packets are transmitted without awaiting the acknowledgement first, it is possible that the recipient does not know, whether the ordinal number of the received packet is k or $k-2^n$, as both numbers will have the same sequence number.

Figure 6:
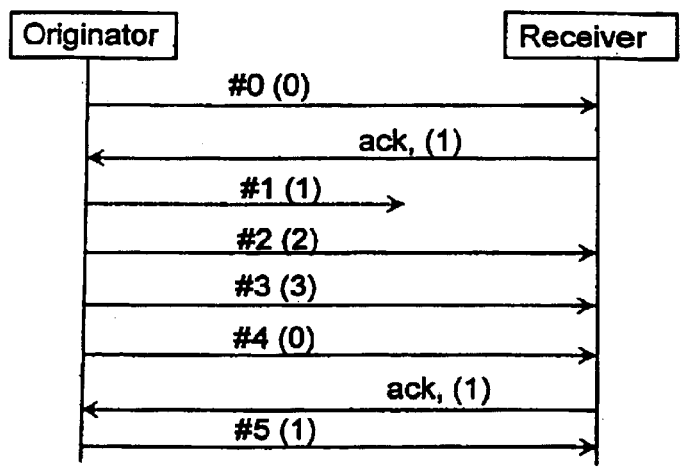
FIG. 6 shows a simplified signalling diagram of data packet acknowledgement dependent on the size of a transmitting window.

This can be illustrated by means of FIG. 6, where, to simplify the matter, n obtains the value 2. In FIG. 6 problems are illustrated, which arise if the size of $2^n (2^2=4)$, and not of $2^n-1$, is defined for the transmitting window. Since n=2, there are four sequence numbers (0, 1, 2, 3) available for data packets, whereby the same data packet numbering starts anew from the fifth, ninth etc. data packets. In FIG. 6, the first data packet (#0) is received, having the sequence number zero. This is acknowledged to the transmitter and the transmitter is informed that the second data packet (#1) is awaited next, having the sequence number one. The second data packet #1 is transmitted, but due to an interference, the reception is not successful. Since the transmitting window size is four, the transmitter does not wait for the acknowledgement of the second data packet #1, but transmits thereafter the third (#2), the fourth (#3) and the fifth (#4) data packet, which obtain the corresponding sequence numbers 2, 3 and 0. Now the transmitting window is full and the transmitter waits for the acknowledgement of the transmitted four data packets. The second data packet #1 is, however, not received, so the recipient requests for a retransmission of the data packet having the sequence number one. The transmitter assumes that the recipient wants to receive the sixth data packet #5, whose sequence number is also one. So, the transmitter transmits erroneously the data packet #5, not the data packet #1 which can no longer be identified and which remains untransmitted. These problems can be avoided by defining $2^n-1$, or $2^2-1=3$ in the case of FIG. 6, as the size of the transmitting window. In the case of the invention, where n=8, the maximum number of data packets is 255 data packets. Thus, according to this embodiment, a restriction is set on the system that the number of unacknowledged data packets to be transferred from the PDCP entity to the RLC layer and placed to the buffer in the PDCP entity is not allowed to exceed 255 data packets at any stage.

The same technical effect is also achieved by setting a restriction on the RLC layer such that at one time, there can be the maximum of 255 data packets RLC-SDU (=PDCP-PDU) on the RLC layer that are to be transmitted. New data packets RLC-SDU can be received whenever previous data packets have been acknowledged to be received in the receiver.

If the number of data packets is needed to be restricted even more, for example when a so-called sliding transmitting window is used, the restriction is preferably made according to the formula The maximum number of data packets=$2^{n-1}$, where n is the bit number of data packet numbers. This formula, too, is defined on the basis of general protocol design rules when a sliding window protocol with an n-bit sequence number space is used. In this case, the biggest allowable size of the transmitting window is $2^{n-1}$, so in the case of the invention, where n=8, the maximum number of data packets equals 128 data packets.

A general prerequisite of implementing the embodiment is that when a handover process begins, a dual-system mobile station is communicating in the UMTS network with a radio network controller RNC from which a handover can be performed between the UMTS and the GPRS system. The restriction according to the embodiment can be used as a default setting in this kind of a radio network controller, or the utilization of the embodiment can be optimized such that the maximum number of unacknowledged data packets is only restricted when the possibility of a handover between the UMTS and the GPRS is big enough. The probability of the handover can for example be defined on the basis of the definition of the strength of the received signal in the part of the radio access network managed by the radio network controller RNC, which definition in turn is based on the measurements of the base stations or the terminal equipment. In the latter case, the measurement data are transmitted by means of the RRC protocol (Radio Resource Control) to the radio network controller RNC. When the signal weakens and decreases below a specific threshold value, indicating that the probability of the handover is getting stronger, the maximum number of unacknowledged data packets will be restricted. Any other method, too, can be employed for defining the probability of a handover.

According to a second embodiment, a restriction is set on the RLC layer such that the number of unacknowledged data packets RLC-SDU (=PDCP-PDU) on the RLC layer is not allowed to exceed said 255 data packets at any stage. Thus, the number of data packets PDCP-PDU that are received on the RLC layer and are to be transmitted is not restricted, only the number of unacknowledged data packets is restricted. For the transmission, the RLC layer divides the data packets RLC-SDU to be transmitted into smaller data units RLC-PDU, which are identified by numbering. The RLC layer is capable of continuously adapting the size of its transmitting window, i.e. the number of data units RLC-PDU to be transmitted at one time. Thus, if the number of unacknowledged data packets RLC-SDU is about 255, the transmitting window size can be adjusted on the RLC layer to be so small that one whole data packet RLC-SDU cannot be transmitted, and the RLC layer does not divide the data packet into smaller data units RLC-PDU. Only after receiving an acknowledgement from the recipient of one or more successfully received, yet unacknowledged data packets RLC-SDU, whose data units RLC-PDU are to be acknowledged, the transmitting window size of the RLC layer can be made bigger such that the next data packet RLC-SDU can be transmitted. The utilization of this embodiment, too, can be optimized as above by restricting the maximum number of unacknowledged data packets on the RLC layer only when the possibility of a handover between the UMTS and the GPRS is high enough.

According to a third embodiment, a restriction can be set on the size of the transmitting window of the protocol layer of the application-level, e.g. TCP layer, above the PDCP layer. When transferring the information handled by the application by means of the UMTS and/or the GPRS, the number of data packets that are transmitted in one burst from the higher protocol layer used by the application to the PDCP layer is restricted. The number of data packets PDCP-SDU received by the PDCP entity is restricted to its maximum value according to the above formula, and the maximum number of data packets in one burst is 255. This way it can be ensured that no data packet PDCP-PDU obtains the same N-PDU number converted according to the GPRS system as some other data packet received by the PDCP entity.

According to a fourth embodiment, the PDCP-PDU numbering used in dual-system mobile stations capable of operating both in the UMTS network and in the GPRS network is always restricted to be 8-bit in length. Thus, a possible confusion in the conversion of data packet numbering is automatically avoided. The mobile stations of the GSM system and the UMTS system contain the information on their own mobile station classmark, indicating what kind of data transmission connections the mobile station can establish and to which telecommunication systems. This mobile station classmark data can be utilized in connection with this embodiment such that when said dual-system mobile station registers in a network, the network and the mobile station start to use 8-bit data packet numbering in their mutual packet-switched data transmission. To ensure the use of 8-bit data packet numbering any one of the embodiments described above can further be used in this connection to restrict the number of data packets to be transferred on different protocol layers.

According to a fifth embodiment, the PDCP-PDU numbering used in dual-system mobile stations capable of operating both in the UMTS network and in the GPRS network is restricted to be 8-bit in length only when the probability of a handover is high enough. Otherwise 16-bit PDCP-PDU numbering is used. In this case the mobile station can profit from the advantages of 16-bit numbering provided by the network most of the time and no attention has to be paid to the restrictions of the data packet numbering. The 8-bit PDCP-PDU numbering can be taken into use in a radio resource control RRC of the system when the signal strength decreases below a predetermined threshold value, for example. The command to change the numbering scheme can be given to a mobile station for example in the set-up of a radio bearer RB or in the reconfiguration of a radio bearer.

It is obvious for a person skilled in the art that as technology develops, the basic idea of the invention can be implemented in various ways. Thus, the invention and the embodiments thereof are not restricted to the above examples but may be modified within the scope of the claims.

What is claimed is:

1. A method of data packet numbering in packet-switched data transmission in connection with a handover, in which responsibility for a connection is transferred from a connection between a mobile station and a first wireless telecommunication network to a connection between said mobile station and a second wireless telecommunication network, in which first wireless telecommunication network a data packet number space available for data packet numbering is bigger than a data packet number space of the second wireless telecommunication network, the method comprising the steps of:

restricting data packet numbering in the first wireless telecommunication network such that numbers of the data packets of the first wireless telecommunication network do not exceed a maximum value of the data packet number space of the second wireless telecommunication network.

2. A method as claimed in claim 1, wherein telecommunication protocols of said first and second wireless telecommunication networks comprise a convergence protocol layer (PDCP, SNDCP) for adapting user data packets to convergence protocol packets and a link layer (RLC, LLC) for transmitting the convergence protocol packets (PDCP-PDU) as data units (RLC-PDU) and for acknowledging the transmission.

3. A method as claimed in claim 2, further comprising the step of restricting a size of a transmitting window of a protocol layer of an application-level, such as a TCP layer, above the PDCP layer to be 255 data packets.

4. A method as claimed in claim 1, further comprising the step of restricting a number of transmitted unacknowledged data packets to substantially 255 data packets (PDCP-PDU).

5. A method as claimed in claim 4, further comprising the step of restricting the number of unacknowledged data packets to be placed to a buffer on the convergence protocol layer to 255 data packets.

6. A method as claimed in claim 5, further comprising the step of performing the restricting of data packet numbering and restricting of the number of transmitted unacknowledged data packets in response to a definition of a strength of a received signal, which is performed in the data transmission between said first telecommunication network and second telecommunication network and a terminal, directing said first telecommunication network and second telecommunication network to prepare for a handover.

7. A method as claimed in claim 4, further comprising the step of restricting the number of unacknowledged data packets transmitted on a link layer to 255 data packets.

8. A method as claimed in claim 7, further comprising the step of restricting, in response to the number of unacknowledged data packets transmitted on the link layer substantially being 255, a size of a transmitting window of the data units to be transmitted on the link layer to be so small so as not to enable the transmission of a whole data packet.

9. A method as claimed in claim 1, further comprising the step of restricting the data packet number space used in the packet-switched data transmission between said mobile station and said first wireless telecommunication network to correspond to the data packet number space of said second wireless telecommunication network.

10. A method as claimed in claim 9, further comprising the steps of utilizing a normal data packet number space in the packet-switched data transmission between said mobile station and said first wireless telecommunication network and restricting the data packet number space used in the packet-switched data transmission between said mobile station and said first wireless telecommunication network to correspond to the data packet number space of said second wireless telecommunication network, in response to said first telecommunication networ and second telecommunication network preparing for a handover.

11. A method as claimed in claim 1, wherein the first telecommunication network comprises a UMTS network using a 16-bit data packet number space and the second telecommunication network comprises a GPRS network using an 8-bit data packet number space.

12. A telecommunication system comprising a mobile station and a first and a second wireless telecommunication network, which are arranged in a packet-switched data transmission to transfer a responsibility for a connection (handover) from a connection between said mobile station and said first wireless telecommunication network to a connection between said mobile station and said second wireless telecommunication network, in which first wireless telecommunication network a data packet number space available for data packet numbering is bigger than a data packet number space of the second wireless telecommunication network, wherein in the first wireless telecommunication network data packet numbering is arranged to be restricted such that numbers of the data packets of the first wireless telecommunication network do not exceed a maximum value of the data packet number space of the second wireless telecommunication network.

13. A telecommunication system as claimed in claim 12, wherein the telecommunication protocols of said first and second wireless telecommunication networks comprise a convergence protocol layer (PDCP, SNDCP) for adapting user data packets to convergence protocol packets and a link layer (RLC, LLC) for transmitting the convergence protocol packets (PDCP-PDU) as data units (RLC-PDU) and for acknowledging a transmission.

14. A telecommunication system as claimed in claim 13, wherein the size of a transmitting window of a protocol layer of an application-level, such as a TCP layer, above a PDCP layer is restricted to be 255 data packets.

15. A telecommunication system as claimed in claim 12, wherein the number of transmitted unacknowledged data packets is arranged to be restricted to substantially 255 data packets (PDCP-PDU).

16. A telecommunication system as claimed in claim 15, wherein the number of unacknowledged data packets to be placed to a buffer in the convergence protocol layer is arranged to be restricted to 255 data packets.

17. A telecommunication system as claimed in claim 16, wherein the restricting of the number of transmitted unacknowledged data packets to substantially 255 data packets and restricting unacknowledged data packets to be placed to the buffer in the convergence protocol layer to 255 data packets are arranged to be performed in response to a definition of a strength of a received signal, which is performed in the data transmission between said first telecommunication network and second telecommunication network and said terminal, directing said first telecommunication network and second telecommunication network to prepare for a handover.

18. A telecommunication system as claimed in claim 15, wherein the number of unacknowledged data packets transmitted on a link layer is arranged to be restricted to 255 data packets.

19. A telecommunication system as claimed in claim 18, wherein in response to the number of unacknowledged data packets transmitted on the link layer substantially being 255, the size of a transmitting window of data units to be transmitted on the link layer is arranged to be restricted to be so small so as not to enable the transmission of a whole data packet.

20. A telecommunication system as claimed in claim 12, wherein the data packet number space used in the packet-switched data transmission between said mobile station and said first wireless telecommunication network is arranged to be restricted to correspond to the data packet number space of said second wireless telecommunication network.

21. A telecommunication system as claimed in claim 20, wherein a normal data packet number space is arranged to be utilized in the packet-switched data transmission between said mobile station and said first wireless telecommunication network and the data packet number space used in the packet-switched data transmission between said mobile station and said first wireless telecommunication network is arranged to be restricted to correspond to the data packet number space of said second wireless telecommunication network, in response to said first telecommunication network and second telecommunication network preparing for a handover.

22. A telecommunication system as claimed in claim 12, wherein the first telecommunication network is a UMTS network using a 16-bit data packet number space and the second telecommunication network is a GPRS network using an 8-bit data packet number space.

23. A terminal for a packet-switched telecommunication system, said terminal being arranged in a packet-switched data transmission to transfer a responsibility for a connection (handover) from a connection between said mobile station and a first wireless telecommunication network to a connection between said mobile station and a second wireless telecommunication, in which first wireless telecommunication network a data packet number space available for data packet numbering is bigger than a data packet number space of the second wireless telecommunication network, wherein the terminal is arranged to restrict data packet numbering of the data packets to be transmitted such that numbers of the data packets do not exceed a maximum value of the data packet number space of the second wireless telecommunication network.

24. A terminal as claimed in claim 23, wherein the terminal is arranged to convert the data packet numbering of the data packets to be sent from the first wireless telecommunication network to correspond the data packet numbering of the second wireless telecommunication network.

25. A terminal as claimed in claim 23, wherein the terminal is arranged to support the telecommunication protocols of said first and second wireless telecommunication networks, said protocols comprising a convergence protocol layer (PDCP, SNDCP) for adapting user data packers to convergence protocol packets and a link later (RLC, LLC) for transmitting the convergence protocol packets (PDCP-PDU) as data units (RLC-PDU) and for acknowledging a transmission.

26. A terminal as claim in claim 25, wherein the terminal is arranged to restrict the number of unacknowledged data packets to be placed to a buffer in the convergence protocol layer to 255 data packets.

27. A terminal as claimed in claim 26, wherein the terminal is arranged to perform the restricting of the number of transmitted unacknowledged data packets to substantially 255 data packets and restricting unacknowledged data packets to be placed to the buffer in the convergence protocol layer to 255 data packets in response to a definition of a strength of a received signal, which is performed in the data transmission between said first telecommunication network and second telecommunication network and said terminal, directing said telecommunication networks to prepare for a handover.

28. A terminal as claimed in claim 25, wherein the terminal is arranged to restrict the number of unacknowledged data packets transmitted on a link layer is arranged to be restricted to 255 data packets.

29. A terminal as claimed in claim 28, wherein the response to the number of unacknowledged data packets transmitted on the link layer substantially being 255, the terminal is arranged to restrict the size of a transmitting window of data units to be transmitted on the link layer to be so small so not to enable the transmission of a whole data packet.

30. A terminal as claimed in claim 25, wherein the terminal is arranged to restrict the size of a transmitting window of a protocol layer of an application-level, such as a TCP layer, above a PDCP layer to be 255 data packets.

31. A terminal as claimed in claim 23, wherein the terminal is arranged to restrict the number of transmitted unacknowledged data packets to substantially 255 data packets (PDCP-PDU).

32. A terminal as claimed in claim 23, wherein the terminal is arranged to restrict the data packet number space used in the packet-switched data transmission between said mobile station and said first wireless telecommunication network to correspond to the data packet number space of said second wireless telecommunication network.

33. A terminal as claimed in claim 32, wherein
the terminal is arranged to utilize a normal data packet number space in the packet-switched data transmission between said mobile station and said first wireless telecommunication network; and
the terminal is arranged to restrict the data packet number space used in the packet-switched data transmission between said mobile station and said first wireless telecommunication network to correspond to the data packet number space of said second wireless telecommunication network, in response to said first telecommunication network and second telecommunication network preparing for a handover.

34. A terminal as claimed in claim 23, wherein the terminal is arranged to communicate with a UMTS network using a 16-bit data packet number space and with a GPRS network using an 18-bit data packet number space.

35. A network element of a first wireless telecommunication system, said network element being arranged to control data packet numbering in a packet-switched data transmission connection between a mobile station and said first wireless telecommunication network, wherein
said network element is arranged, when a responsibility for a connection is transferred (handover) from a connection between said mobile station and said first wireless telecommunication network to a connection between said mobile station and a second wireless telecommunication network having smaller data packet number space available for data packet numbering than in the first wireless telecommunication network, to restrict data packet numbering of the data packets to be transmitted such that numbers of the data packets do not exceed a maximum value of the data packet number space of the second wireless telecommunication network.

36. A network element as claimed in claim 35, wherein the network element is arranged to convert the data packet numbering of the data packets to be sent from the first wireless telecommunication network to correspond the data packet numbering of the second wireless telecommunication network.

37. A network element as claimed in claim 35, wherein the wireless telecommunication network of the network element comprises a convergence protocol layer (PDCP, SNDCP) for adapting user data packets to convergence protocol packets and a link layer (RLC, LLC) for transmitting the convergence protocol packets (PDCP-PDU) as data units (RLC-PDU) and for acknowledging a transmission.

38. A network element as claimed in claim 37, wherein the network element is arranged to restrict the number of unacknowledged data packets to be placed to a buffer in the convergence protocol layer to 255 data packets.

39. A network element as claimed in claim 38, wherein the network element is arranged to perform the restricting of the number of transmitted unacknowledged data packets to substantially 255 data packets and restricting unacknowledged data packets to be placed to the buffer in the convergence protocol layer to 255 data packets in response to a definition of a strength of a received signal, which is performed in the data transmission between said first telecommunication network and second telecommunication network and said terminal, directing said telecommunication networks to prepare for a handover.

40. A network element as claimed in claim 37, wherein the network element is arranged to restrict the number of unacknowledged data packets transmitted on a link layer is arranged to be restricted to 255 data packets.

41. A network element as claimed in claim 40, wherein in response to the number of unacknowledged data packets transmitted on the link layer substantially being 255, the network element is arranged to restrict the size of a transmitted window of data units to be transmitted on the link layer to be so small so as not to enable the transmission of a whole data packet.

42. A network element as claimed in claim 37, wherein the network element is arranged to restrict the size of a transmitting window of protocol layer of an application-level, such as a TCP layer, above a PDCP layer to be 255 data packets.

43. A network element as claimed in claim 35, wherein the network element is arranged to restrict the number of transmitted unacknowledged data packets to substantially 255 data packets (PDCP-PDU).

44. A network element as claimed in claim 35, wherein the network element is arranged to restrict the data packet number space used in the packet-switched data transmission between said mobile station and said first wireless telecommunication network to correspond to the data packet number space of said second wireless telecommunication network.

45. A network element as claimed in claim 44, wherein
the network element is arranged to control a normal data packet number space to be used in the packet-switched data transmission between said mobile station and said first wireless telecommunication network; and
the network element is arranged to restrict the data packet number space used in the packet-switched data transmission between said mobile station and said first wireless telecommunication network to correspond to the data packet number space of said second wireless telecommunication network, in response to said first telecommunication network and second telecommunication network preparing for a handover.

* * * * *